US007228883B1

(12) United States Patent
Murray

(10) Patent No.: US 7,228,883 B1
(45) Date of Patent: Jun. 12, 2007

(54) MOTORIZED BARRIER OPERATOR SYSTEM UTILIZING MULTIPLE PHOTO-EYE SAFETY SYSTEM AND METHODS FOR INSTALLING AND USING THE SAME

(75) Inventor: James S Murray, Milton, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 378 days.

(21) Appl. No.: 10/860,439

(22) Filed: Jun. 3, 2004

(51) Int. Cl.
*E05D 15/00* (2006.01)
*E05F 15/00* (2006.01)
*H02P 1/04* (2006.01)

(52) U.S. Cl. ...................... 160/201; 160/201; 160/310; 49/199; 49/26; 318/272; 318/466

(58) Field of Classification Search ................ 160/188, 160/201, 189, 1, 7, 310; 318/272, 286, 466–469, 318/480; 49/197, 199, 200, 26–28
See application file for complete search history.

(56) References Cited

U.S. PATENT DOCUMENTS

| | | | | |
|---|---|---|---|---|
| 4,851,746 | A * | 7/1989 | Milke | 318/467 |
| 4,922,168 | A | 5/1990 | Waggamon et al. | 318/286 |
| 5,285,136 | A | 2/1994 | Duhame | 318/266 |
| 5,286,967 | A | 2/1994 | Bates | 250/205 |
| 5,428,923 | A | 7/1995 | Waggamon | 49/28 |
| 5,465,033 | A | 11/1995 | Fassih-Nia | 318/480 |
| 5,584,145 | A * | 12/1996 | Teich | 49/506 |
| 5,656,900 | A * | 8/1997 | Michel et al. | 318/286 |
| 5,758,705 | A * | 6/1998 | Wagner et al. | 160/310 |
| 6,019,156 | A * | 2/2000 | Wagner et al. | 160/310 |
| 6,243,006 | B1 * | 6/2001 | Rejc et al. | 340/436 |
| 6,563,278 | B2 * | 5/2003 | Roman | 318/282 |
| 6,563,431 | B1 | 5/2003 | Miller, Jr. | 340/932.2 |
| 6,750,441 | B2 | 6/2004 | Imahori et al. | 250/221 |

* cited by examiner

*Primary Examiner*—Hugh B. Thompson, II
*Assistant Examiner*—Candace Bradford
(74) *Attorney, Agent, or Firm*—Renner Kenner Greive Bobak Taylor & Weber

(57) ABSTRACT

A movable barrier operator system includes a motorized operator which moves a barrier between limit positions, and a photo-electric safety system connected to the motorized operator. The photo-electric safety system monitors for obstructions at more than one height along the barrier's path between limit positions. This is done by installing a supplemental photo-electric safety system to work in conjunction with a pre-existing photo-electric safety system connected to the motorized barrier operator.

17 Claims, 4 Drawing Sheets

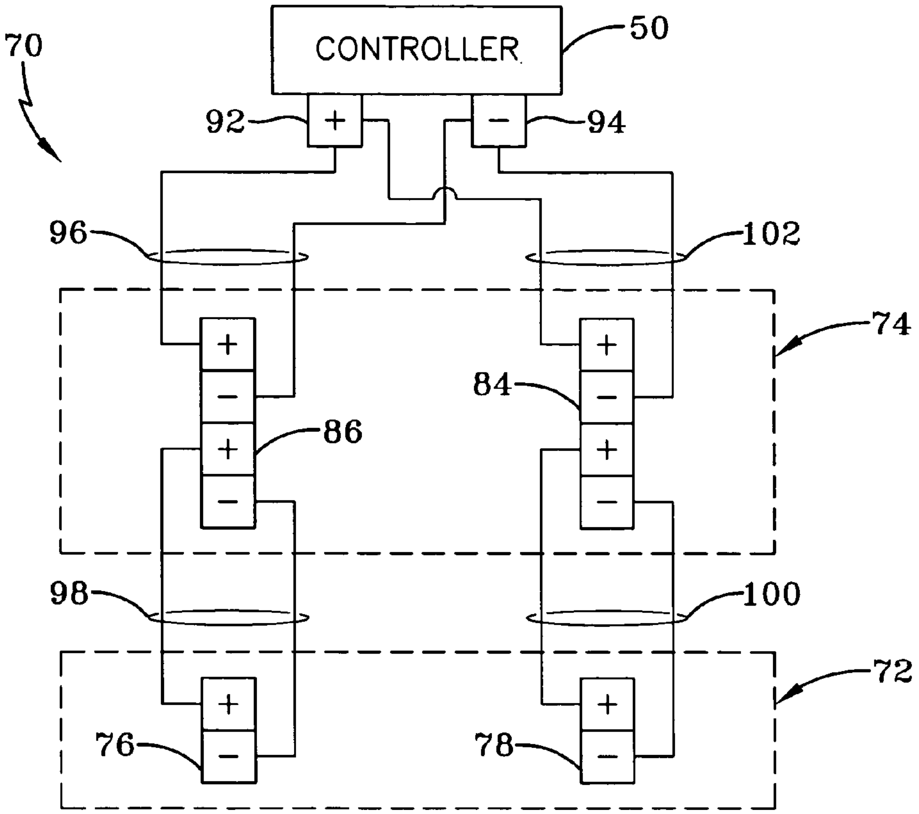
FIG−4
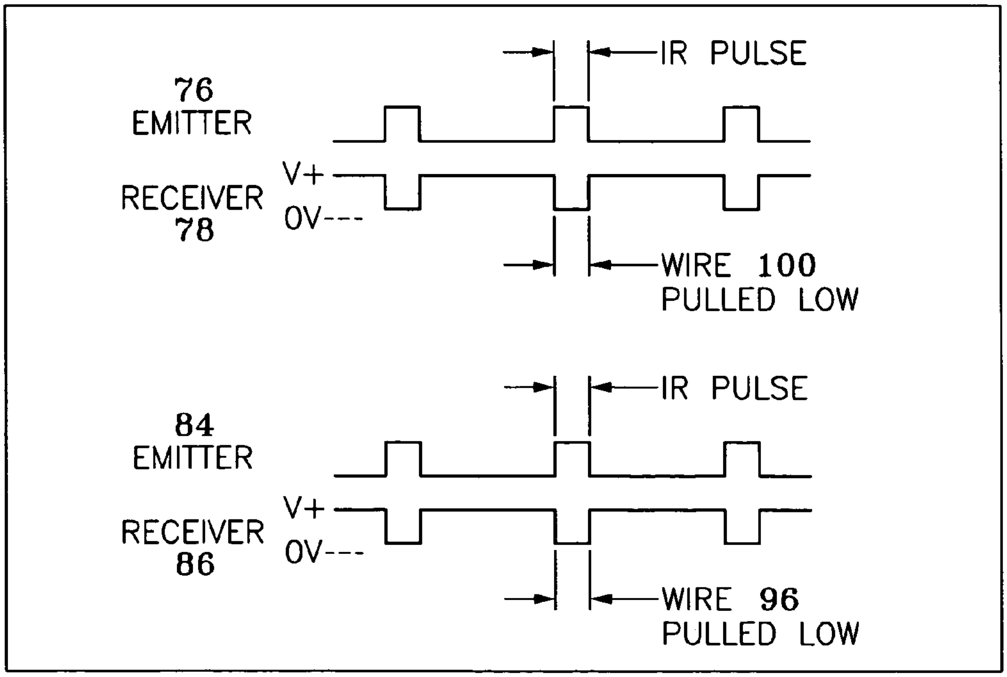
FIG−5

MOTORIZED BARRIER OPERATOR SYSTEM UTILIZING MULTIPLE PHOTO-EYE SAFETY SYSTEM AND METHODS FOR INSTALLING AND USING THE SAME

TECHNICAL FIELD

Generally, the present invention relates to a movable barrier operator system for use on a closure member moveable relative to a fixed member. More particularly, the present invention relates to an operator-controlled motor for controlling the operation of a closure member, such as a gate or door, between a closed position and an open position. More specifically, the present invention relates to a barrier operator, wherein the operator utilizes multiple photo-eyes to detect obstructions at different heights.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command signals for the purpose of opening and closing the door from a wireless remote, from a wired or wireless wall station or other similar device. It is also known to provide safety devices that are connected to the operator for the purpose of detecting an obstruction so that the operator may then take corrective action with the motor to avoid entrapment of the obstruction.

How safety devices are used with a door operator system have evolved from the days of no uniform standard to the currently applied government regulations as embodied in Underwriters Laboratories Standard 325. UL Standard 325 encompasses safety standards for a variety of movable barriers such as gates, draperies, louvers, windows and doors. The standard specifically covers vehicular gate or door operators intended for use with garages and/or parking areas. Such devices require a primary safety system and a secondary safety system which are independent of each other. Primary entrapment systems sense the operator motor's current draw or motor speed and take the appropriate corrective action if the monitored value is exceeded. Primary systems must be internal within the operator head. Secondary entrapment systems are typically external from the operator head and may include a non-contact or contact type sensor. But, secondary systems may also be internal to the operator head as long as they are independent of the primary system.

One of the more widely used secondary entrapment, non-contact devices is a photo-electric eye which projects an infrared light beam across the door's travel path. If the light beam is interrupted during closure of the door, the operator stops and reverses the travel of the door. Regardless of how the safety devices work, their purpose is to ensure that individuals, especially children, are not entrapped by a closing door. The photo eyes consist of an "emitter" unit and a "receiver" unit. The emitter emits an infrared (IR) signal that the receiver receives. Upon receiving the IR signal, the receiver responds back to the operator. As shown in FIGS. 1A and 1B, the typical photo eye systems use a 2 wire connection system. Each photo eye set, the emitter and the receiver, has two wires. One wire is identified as the "+" (plus) wire, and the other wire is identified as the "−" (minus) wire. The plus wire is both the power source, typically 10 VDC to 35 VDC, and the signal wire, while the minus wire is the DC 'ground' reference wire. The emitter is connected to a power source, preferably in the operator power head, by a wire-1A that includes the plus wire and the minus wire. In a similar manner, the receiver is connected to the operator power head by a wire-1B that also includes a plus wire and a minus wire.

Referring now to FIG. 1C, it can be seen that the receiver, upon detecting an IR signal generated by the emitter can "pull" the power/signal plus wire to a low voltage level close to DC ground. The operator power head detects the power/signal line being pulled low by the receiver and interprets this as a successful IR signal transmission between the emitter and receiver. If the IR signal is interrupted as the door moves downwardly—the power/signal line is not pulled low—then the operator power head takes corrective action and at least stops movement of the barrier.

UL 325 requires that the photo eye system be installed to detect a 6 inch high object. Thus the photo eyes are typically installed at a height of 4 inches to 6 inches above the garage floor. At this height, the IR beam will be interrupted by a small child lying on the floor, which is under the door's path of travel. But, one issue consumers have with this arrangement is that the IR beam can shoot under a vehicle if it is parked only half-way into the garage. For example, many people park their vehicle half-way in the garage during service repair to the engine so as to allow more room for the person to maneuver in front of the vehicle. The IR beam shoots behind the front tires, in front of the rear tires and under the vehicle's frame, missing the vehicle completely. If a vehicle is parked in this position and then a person commands the door to close, the operator closes the door and the door strikes the top surface of the car. The operator then detects the car's presence by its primary inherent entrapment protection system and reverses the door's direction thereby opening the door to its fully-open position. But the door striking the vehicle can cause damage to the vehicle's surface. Therefore, some users of garage door operators mount the photo eyes at a height greater than 6 inches in an attempt to detect a vehicle parked half-way into the garage. But, mounting the photo eyes greater than 6 inches off of the floor creates a hazard since the photo eyes are unable to detect a child laying on the floor.

Several patents disclose various safety and photo-eye configurations, but none appear to directly address the problem of photo-eye height adjustment undertaken by the end user. For example, U.S. Pat. No. 4,922,168 to Waggamon, et al. discloses a safety system with universal attachment to existing garage door openers. A transmitter of infrared energy transmits a beam laterally of the door opening to detect any obstruction to door closing movement. A safety control circuit is adapted for connection to the main control circuit of the existing garage door opener. The existing push button switch is disconnected from the main control circuit and connected to the new safety control circuit. A flexible cable or cord is connected for actual movement in accordance with movement of the door and is connected to the safety control circuit at a reel on which the cord is wound. And the safety control circuit determines if there is actual door movement and actual door closing movement, as well as being responsive to an obstruction to door closing movement to apply a signal to stop the door and then apply another signal to start the door in its opening movement.

U.S. Pat. No. 5,285,136 to Duhame discloses an automatic door operator with a continuously monitored supplemental obstruction detector. In a first embodiment, the obstruction detector is a radiant beam obstruction detector that transmits a beam of modulated radiant energy across the door opening. A safety signal generator produces an active safety signal only on unobstructed receipt of radiant energy by a receiver. Failure to receive the active safety signal when the motor is closing the door at least stops the door. A two wire cable, which carries both power and the active safety signal, connects the supplemental obstruction detector to the automatic door operator. Constant activation of a portable transmitter or of a local push button can override the supplemental obstruction detector to close the door. An alternative supplemental obstruction detector includes a safety edge having a compressible tube disposed on a leading end of the door. Plural conductors change their conductive state upon compression of the compressible tube. An oscillator sealed within the tube at one end supplies the safety signal. This embodiment may include a delay upon detection of compression of the compressible tube so that contact with the floor is not detected as an obstruction.

U.S. Pat. No. 5,286,967 to Bates a modulated light beam obstacle detector for use as a safety mechanism in an automatic closure operator which must operate in varying ambient light conditions. If the obstacle detector senses the interruption of the light beam, the motion of the door is arrested or reversed. The obstacle detector uses an auxiliary light source connected in a feedback circuit to maintain a constant background illumination on the light detector and thereby hold the light detector in conduction at all times. In this manner, the presence of the light beam can be sensed regardless of the ambient light conditions.

U.S. Pat. No. 5,428,923 to Waggamon discloses that a light beam in an obstruction detector is coded into packets of pulses by a transmitter according to a code generated only by the transmitter. When the light beam is received, the receiver recovers the code signal and supplies it to a code detection circuit. In one preferred embodiment, to detect the code, the code detection circuit supplies the code signal and a delayed version of the code signal to an "exclusive or" gate. In another embodiment, a frequency detection circuit determines whether the code signal detected by the receiver is within a predetermined permissible range. If the code is not present, the door operator system reverses the door if it is closing, and prevents the door from closing if it already is in the up position, or if it is opening. The door operator system will operate in this way not only in response to obstructions, but also, in response to errors and malfunctions in the wiring to the transmitter and receiver, and in the transmitter and receiver themselves.

U.S. Pat. No. 5,465,033 to Fassih-Nia discloses a safety system which comprises a light beam transmitter and receiver and means connected through a standard AC power plug to the main power supply of an automatic garage door opener for controlling the power thereto. The transmitter transmits a beam of light across the opening of a garage door. The receiver is positioned to receive the light beam if there is nothing obstructing the beam. The receiver generates a signal indicating when the beam is being received. The means disconnects the power to the garage door opener when a signal is generated indicating that the light beam is not being received. The garage door is thus prevented from making contact with and hurting or damaging a person or object in its path.

U.S. Pat. No. 5,584,145 to Teich discloses a wireless safety system for a garage door opener adapted for use at least in part with an independent energy source. The wireless safety system includes a control circuit for controlling movement of the garage door. An activation member provides an input to the control circuit to initiate motion of the garage door. A detecting member detects whether an obstruction is present in the path of the garage door. The detecting member includes a first state, wherein the detection member does not detect obstructions and consumes minimal energy, and a second state wherein the detection member detects obstructions. The detection member is selectively switchable between the first state (dormant) and the second state (active) by the control circuit.

U.S. Pat. No. 5,656,900 to Michel, et al. discloses a garage door operator has an electric motor controlled by a control unit. A transmission is connected to the motor to be driven thereby to open and close a garage door. An infrared obstacle detector is connected to the control unit and includes a unitary infrared pulse emitter and an infrared detector. A missing pulse detector is coupled to the infrared detector to generate a door opening signal if the door is closing when the pulses are absent due to the infrared being interrupted by an obstacle or not having been generated. The control unit receives the door opening signal and causes the electric motor to open the garage door.

As will be appreciated from a review of the above patents, none appreciate the problem associated with the end-user surreptitiously moving the photo-eye set from the intended location. Therefore, there is a need in the art to further improve the safety features provided by a photo-eye system.

DISCLOSURE OF INVENTION

It is thus an object of the present invention to provide a motorized barrier operator system utilizing multiple photo-eye safety system and methods for installing and using the same.

In general, the present invention contemplates a movable barrier operator system, comprising a motorized operator which moves a barrier between limit positions; and a photo-electric safety system connected to the motorized operator, wherein the photo-electric safety system monitors for obstructions at more than one height along the barrier's path between limit positions.

The invention further contemplates a supplemental photo-electric eye safety system used in conjunction with a motorized barrier operator system having a primary photo-electric eye safety device which includes a primary emitter mounted at one side of an opening enclosed by the barrier, and a primary receiver mounted on another side of the opening and aligned to receive a beam from said primary emitter, wherein a controller monitors the primary emitter and the primary receiver, and initiates corrective action if the beam is interrupted, the supplemental photo-electric eye safety system comprising a supplemental emitter including supplemental emitter terminals connectable to the controller and the primary receiver, and a supplemental receiver including supplemental receiver terminals connectable to the controller and the primary receiver.

The invention also contemplates a method for detecting obstructions of different heights in the path of a motorized movable barrier, comprising emitting a first beam across the movable barrier's path, receiving the first beam, triggering emission of a second beam across the movable barrier's path at a height different than the first beam, receiving the second beam and initiating at least stoppage of the movable barrier if one of the beams is interrupted.

The invention also contemplates a method for installing a supplemental photo-electric safety system to work in conjunction with a pre-existing photo-electric safety system connected to a motorized barrier operator, comprising cutting a first wire connected between a pre-existing emitter and a controller, electrically connecting a receiving device between ends of the cut first wire, cutting a second wire connected between a pre-existing receiver and the controller, and electrically connecting an emitting device between ends of the cut second wire.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 4 is a wiring schematic of the photo-eye safety system; and

FIG. 5 is a signal timing sequence employed by the photo-eye safety system.

BEST MODE FOR CARRYING OUT THE INVENTION

Figure 1A:
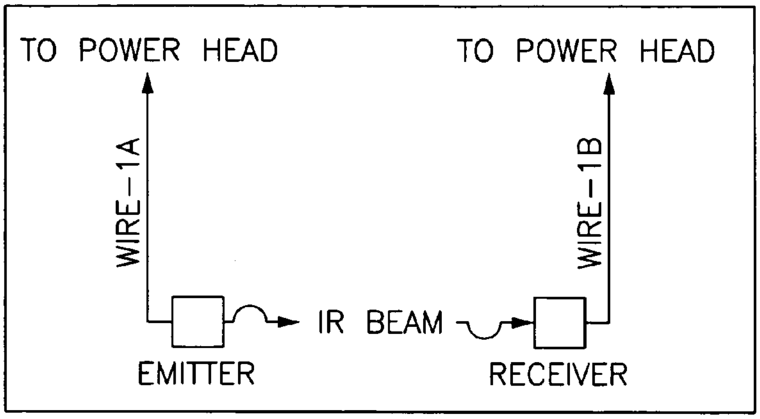
FIG–1A PRIOR ART
FIGS. 1A-C are schematic drawings and a timing sequence of a prior art photo-eye safety system.
Figure 1B:
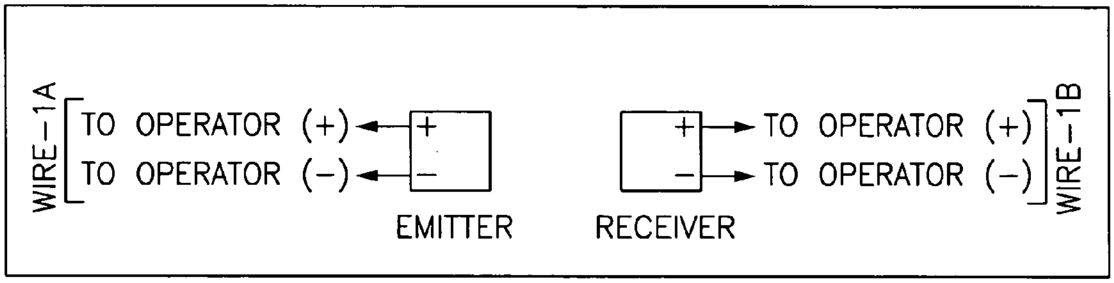
FIG–1B PRIOR ART
Figure 1C:
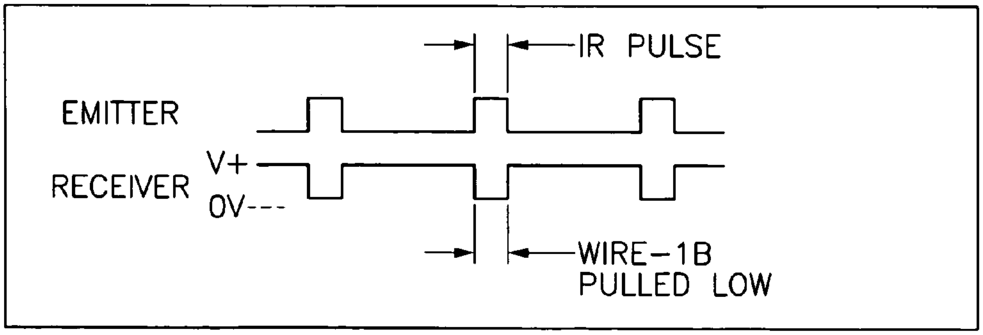
FIG–1C PRIOR ART
Figure 2:
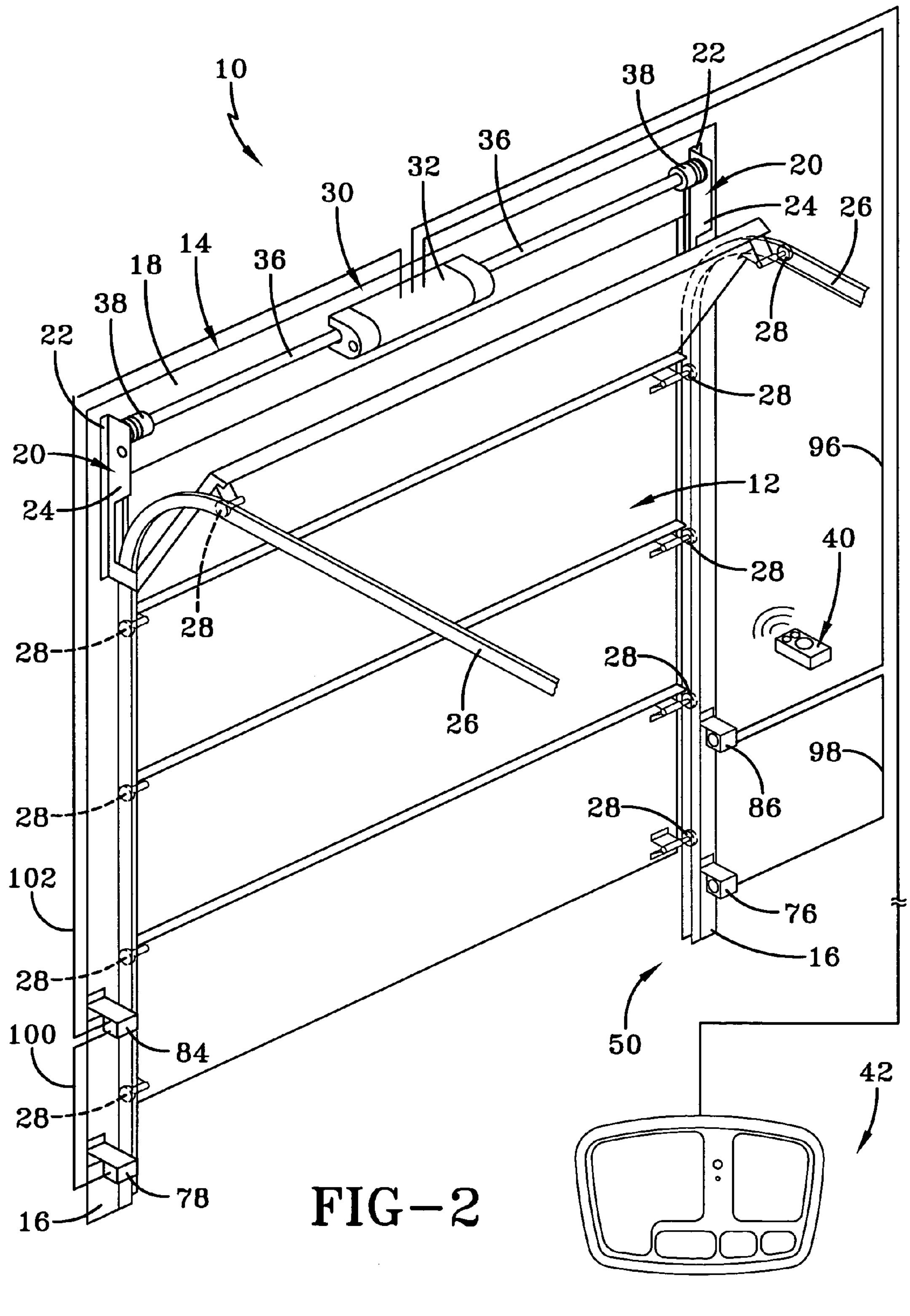
FIG. 2 is a fragmentary perspective view depicting a sectional garage door and showing an operating mechanism with a photo-eye safety system embodying the concepts of the present invention.

A motorized barrier operator adaptable to different safety configurations is generally indicated by the numeral 10 in FIG. 2 of the drawings. The system 10 is employed in conjunction with a conventional sectional garage barrier or door generally indicated by the numeral 12. The teachings of the present invention are equally applicable to other types of movable barriers such as single panel doors, gates, windows, retractable overhangs, and any device that at least partially encloses an area. The door 12 is most likely an anti-pinch type door. The opening in which the door is positioned for opening and closing movements relative thereto is surrounded by a frame, generally indicated by the numeral 14, which consists of a pair of vertically spaced jamb members 16 that, as seen in FIG. 1, are generally parallel and extend vertically upward from the ground (not shown). The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism generally indicated by the numeral 34 as seen in FIG. 2. Extending from each end of the operator mechanism 34 is a drive shaft 36, the opposite ends of which are received by tensioning assemblies 38 that are affixed to respective projecting legs 24. Carried within the drive shaft 36 are counterbalance springs as described in the '010 patent. Although a header-mounted operator is specifically discussed herein, the control features to be discussed later are equally applicable to other types of operators used with movable barriers. This includes, but is not limited to, trolley, jackshaft, screw-type or other header-mounted operators.

In order to move the door from an open position to a closed position or vice versa, a remote transmitter 40, a wall station transmitter 42 or a keyless entry pad may be actuated. The remote transmitter 40 may use infrared, acoustic or radio frequency signals that are received by the operator mechanism to initiate movement of the door. Likewise, the wall station 42 may perform the same functions as the remote transmitter 40 and also provide additional functions such as the illumination of lights and provide other programming functions to control the manner in which the barrier is controlled. The wall station 42 may either be connected directly to the operator mechanism 34 by a wire or it may employ radio frequency or infrared signals to communicate with the operator mechanism 34. The wall station is preferably positioned within the line of sight of the barrier as it moves between positions.

Figure 3:
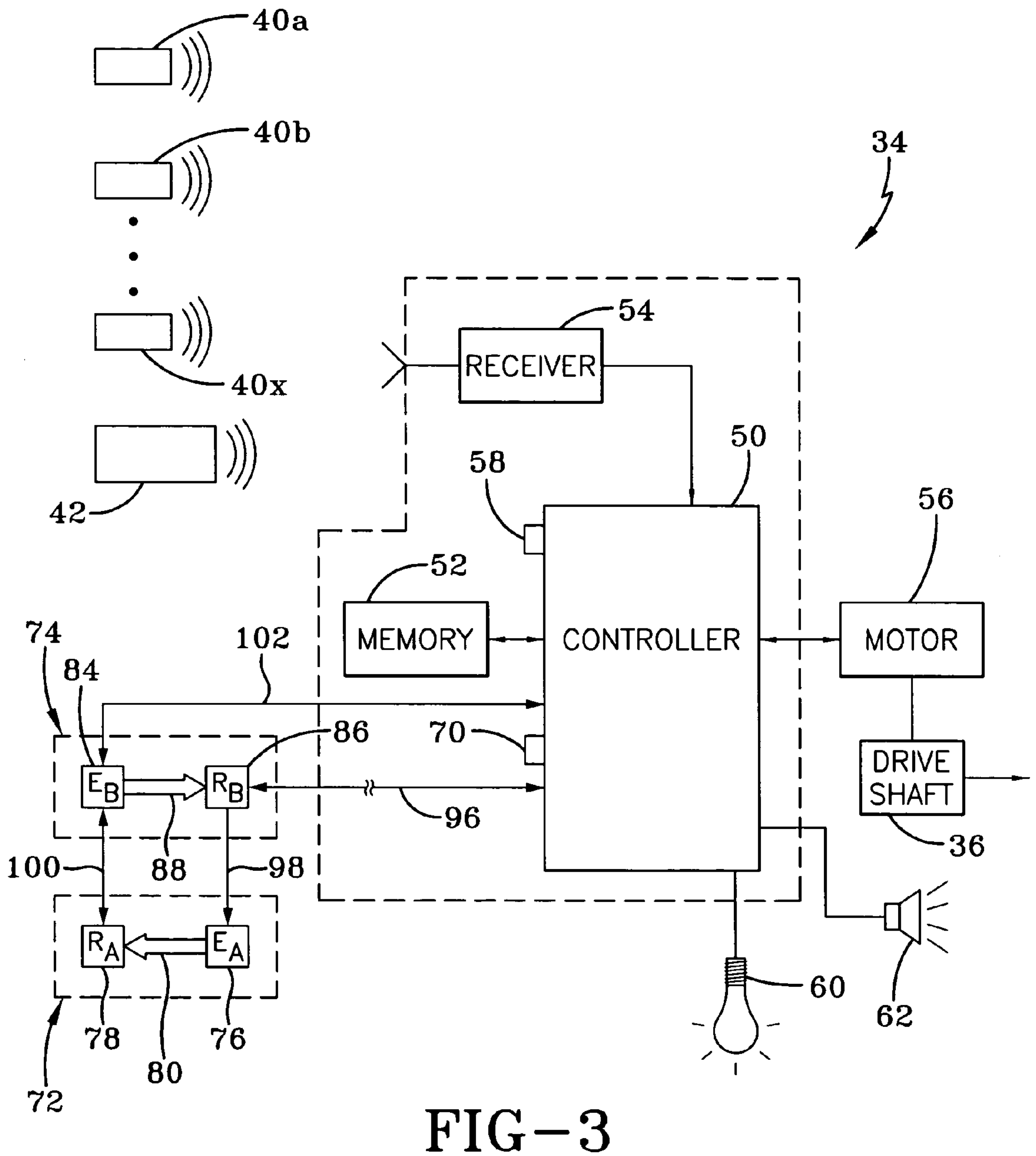
FIG. 3 is a schematic diagram of an operator mechanism with the photo-eye safety system.

Referring now to both FIGS. 2 and 3 it can be seen that operator mechanism 34 includes a controller 50. The controller 50 receives power from batteries or some other appropriate power supply. The controller 50 includes the necessary hardware, software and a memory device 52 to implement operation of the operator 34. It will be appreciated that the memory device may be integrally maintained within the controller. When either the remote transmitter 40 or wall station 42 is actuated, a receiver 54 receives the signal and converts it into a form usable by the controller 50. If a valid signal is received by the controller 50, it initiates movement of the motor 56 which, in turn, generates rotatable movement of the drive shaft 36 and the barrier is driven in the appropriate direction. Other features of the system 10 may include a light 60 and an audio speaker 62, both of which are connected to the controller 50. The light 60 may be toggled on and off by an appropriate button on the wall station 42 or upon initial barrier movement. And the light 60 or the speaker 62 may signal entry into programming modes upon the pressing and releasing of a program button 58 that is operatively connected to the controller 50. Entering of a programming mode with the button 58 allows for the controller to enable and/or disable various operator features. These modes may be entered by selective actuation of buttons on the wall station 42 or by other known means.

An external secondary entrapment system is designated generally by the numeral 70 in the system 10. In the present embodiment, the entrapment system is a photo-eye system. The system 70 includes a first emitter-receiver pair 72 that is coupled with a second emitter-receiver pair 74. It will be appreciated that the photo-eye system 70 may be installed as a complete system. In the alternative, the photo-eye system 70 may utilize an existing emitter-receiver pair 72 which is modified to incorporate the second emitter-receiver pair 74. In other words, this system allows for retrofitting existing photo-eye systems to provide an added level of safety to garage door operators.

The first emitter-receiver pair 72 includes a sending unit or emitter 76 that is mounted to either the jamb 16 or the track 26 near the floor of the door area on one side of the opening. Likewise, the receiving device 78 is mounted on the opposite jamb 16 or the track 26 at a corresponding height. Preferably, the emitter 76 and the receiver 78 are mounted above the floor and in the interior side of the door opening to minimize any interference by the sun or other extraneous light sources. It will be appreciated that the emitter 76 and the receiver 78 may be reversed if needed. In any event, the emitter 76 emits a visible, laser or infrared light beam 80 that is detected by the receiver 78.

Coupled with the first emitter-receiver pair 72 is the second emitter-receiver pair 74. The emitter-receiver pair 74 includes a second emitter or sending device 84 that is mounted to the jamb 16 or the track 26 at a predetermined distance above the first receiver 78. Likewise, a second receiver 86 is mounted on the other jamb 16 or track 26 at the predetermined distance above the first emitter 76. As noted previously, the first emitter-receiver pair 72 is mounted at a height of about 5 to 6 inches as mandated by the UL 325 safety standard. The height of the second emitter-receiver pair 74 with respect to the first pair 72 is determined by the end user so as to ensure that a desired height of an anticipated obstruction is detected. For example, the second emitter-receiver pair is typically set to a height so as to ensure that when a car is parked half-in and half-out of the garage that such an event will interrupt a light beam 88—which is either visible, laser or infrared light—transmitted between the emitter 84 and the receiver 86. This of course will cause an obstruction to be detected such that the controller may take corrective action as will be described.

Both emitter-receiver pairs 72 and 74 are connected to the controller 50 which, as best seen in FIG. 4 includes a + terminal 92 and a – terminal 94. The wires connecting the controller 50 are two-lead wires, wherein one of the leads is connected between the respective positive terminals so as to provide power and the signal and the other lead provides the ground reference between the respective negative terminals. Accordingly, a wire 96 is connected between the positive and negative terminals of the controller 50 and the positive and negative terminals of the receiver 86. A wire 98 is connected between the terminals of second receiver 86 and the corresponding positive and negative terminals of the first emitter 76. A wire 100 is connected between the corresponding positive and negative terminals of the first receiver 78 and the second emitter 84. And, a wire 102 is connected between the positive and negative terminals of the second emitter and the respective positive and negative terminals of the controller 50.

Based upon the foregoing it will be appreciated that existing photo-eye systems may be modified. Or the photo-eye system 70 may be installed anew upon installation of the door and operator. In any event, the existing or primary photo-eye pair 72 is installed at the desired six inch height and the appropriate connections are made to the controller 50. Next, the supplemental photo-eye pair 74 is installed approximately twelve inches or other predetermined height higher than primary photo-eye pair. It will be appreciated that the emitter-receiver pair 74 is not a standard emitter-receiver that is shipped with the garage door operator, but is of a special design to allow multiple sets of photo-eyes to operate simultaneously and also dependently. The second emitter-receiver pair 74 contains specific internal wiring and operational features to be the "second set of photo-eyes" installed in conjunction with a garage door operator. In other words, the original photo-eyes shipped with the operator cannot be used as a second set of photo-eyes because of IR signal conflicts and electrical signal conflicts between the two sets of photo-eyes. Accordingly, the second emitter-receiver pair 74 has unique features so that it can be incorporated into the garage door operator system of any manufacturer's original photo-eye safety system.

As best seen in FIG. 2, the original wire between the controller and the first emitter-receiver pair 72 is interrupted by the connection of the second emitter-receiver pair 74. In other words, the photo-eyes on one side of the garage door opening are connected in a "serial" manner. An electrical signal from the operator to the original photo-eye pair or from the original photo-eye pair to the operator first passes through the supplemental photo-eye pair. In other words, as seen in FIGS. 3 and 4, wires 96 and 102 are connected directly from the controller to the second emitter-receiver pair 74 which then is connected to the first emitter-receiver pair 72.

The mounting arrangement of the emitters and receivers is such that an emitter is on each side and a receiver is on each side of the barrier opening so that the photo-eye beam travels left-to-right for one pair and then right-to-left for the other pair. This arrangement reduces infrared interferences between the two photo-eye systems since receiver 86 cannot directly receiver infrared signals from emitter 76 and vice-versa. Only receiver 72"sees" the infrared signal from emitter 76 and only receiver 86 "sees" the IR signal from the emitter 84.

With reference to FIG. 5 and the other Figs., the preferred operational sequence of the photo-eye system 70 will be reviewed. Initially, emitter 76 periodically sends out the beam 80 in the form of a short duration infrared pulse. Receiver 78 receives the beam 80, whereupon receiver 78 pulls the voltage on wire 100 low during pulse reception. The emitter 84 then detects that the voltage on wire 100 is low and sends out the beam 88 in the form of an infrared pulse which is detected by the receiver 86, which pulls the voltage on wire 96 low during infrared pulse reception. Thus it will be appreciated that the primary photo-eye pair 72 performs in the same way as in the prior art. However, the pair 72 does not detect the changes incorporated by the pair 74. Accordingly, the voltage on the wire 96 is pulled 30 low similar to what occurs with the single photo-eye set. In other words, the voltage on wire 96 is pulled low during an IR pulse. Thus, the controller 50 receives the same electrical signal information as if there were only one photo-eye set. And the emitter 84 only sends an infrared pulse when the voltage on the wire 100 is pulled low by virtue of the emitter 76 automatically and periodically sending the original infrared pulse—the trigger for the series of events. Thus it will be appreciated that there is no external trigger needed to cause the emitter 76 to send an infrared signal, however, emitter 84 does require a trigger. Stated another way, inclusion of the second emitter-receiver pair 74 allows for the sequence of signals to proceed as follows. First, an infrared pulse is emitted from emitter 76 periodically. Each infrared pulse is received by receiver 78 and receiver 78 "passes" the infrared pulse to the emitter 84 by way of an electrical signal on wire 100. Emitter 84 then emits an infrared pulse which is then received by receiver 86. Receiver 86 "passes" this infrared pulse to the controller by way of an electrical signal on wire 96. The sequence of events starts at emitter 76 and ends at receiver 86. Thus, the photo-eye safety obstruction detection occurs upon interruption of either of the emitter-receiver beam 80 (a primary obstruction) or the emitter-receiver beam 88, a secondary obstruction. Upon any interruption of either beam during door movement, the system 70 effectively generates an obstruction signal received by the controller. Also if any of the wires become open or shorted, no electrical infrared pulse acknowledgment signal is sent to the controller. This also causes the operator to stop movement of the barrier. The infrared pulses emitted are typically about one millisecond in duration and the blank time between infrared pulses is typically about five milliseconds in duration.

Based upon the foregoing, the advantages of the present invention are readily apparent. Primarily, the present invention allows for the detection of objects such as a car or child's wagon that normally avoids detection by bridging the initially installed photo-eye beams. In other words, in addition to detecting the presence of a small child or small item, the present invention also allows for detection of larger items such as automobiles and the like that may be present in the path of the moving door. The invention is also advantageous in that it allows for use of photo-eye beams that are oriented in different directions so as to minimize any interference therebetween. Yet another advantage of the present invention is that it allows for simple modification of existing photo-eye beam safety systems at minimal cost.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A movable barrier operator system configured to move a barrier along a path between upper and lower limit positions, the system comprising:

a motorized operator which moves the barrier between upper and lower limit positions of the path; and a photo-electric safety system connected to said motorized operator, wherein said safety comprises:

a first emitter-receiver pair positioned at a primary obstruction detection height and generating a primary obstruction signal upon detection of an obstruction; and a second emitter-receiver pair positioned at a secondary obstruction detection height and generating a secondary obstruction signal upon detection of an obstruction, wherein said first and second emitter-receiver pairs are connected to one another; and wherein said photo-electric safety systems monitors for obstructions at more than one height along the path, and said motorized operator initiates corrective action upon receipt of one of said primary and said secondary obstruction signals.

2. The operator system according to claim 1, wherein said first emitter-receiver pair comprises a first emitter and a first receiver, wherein said first emitter generates a first infrared beam receivable by said first receiver, and wherein said second emitter-receiver pair comprises a second emitter and a second receiver, wherein said first receiver is connected to said second emitter, and wherein said second emitter generates a second infrared beam receivable by said second receiver, either said emitter-receiver pair generating said obstruction signal upon interruption of either of said infrared beams.

3. The operator system according to claim 1 adapted for use with a pair of spaced apart jamb members, each jamb member supporting a track that carries the barrier, wherein said first emitter and said second receiver are spaced apart from one another and electrically connected to one another and said operator and are adapted to be carried by one of the jamb members; and wherein said first receiver and said second emitter are spaced apart from one another and electrically connected to one another and said operator and adapted to be carried by the other of the jamb members.

4. The operator system according to claim 1, wherein said second emitter-receiver pair comprises:

a second emitter comprising plus and minus controller terminals, which are internally connected to plus and minus first receiver terminals; and a second receiver comprising plus and minus controller terminals, which are internally connected to plus and minus first emitter terminals.

5. The operator system according to claim 4, wherein said first emitter-receiver pair comprises:

a first emitter having plus and minus terminals; and a first receiver having plus and minus terminals, such that said first emitter's plus and minus terminals are connected to said second receiver's corresponding plus and minus first emitter terminals, and said first receiver's plus and minus terminals are connected to said second emitter's corresponding plus and minus first receiver terminals.

6. A supplemental photo-electric eye safety system used in conjunction with a motorized barrier operator system having a primary photo-electric eye safety device which includes a primary emitter mounted at one side of an opening enclosed by the barrier, and a primary receiver mounted on another side of the opening and aligned to receive a beam from said primary emitter, wherein a controller monitors the primary emitter and the primary receiver, and initiates corrective action if the beam is interrupted, the supplemental photo-electric eye safety system, comprising:

a supplemental emitter including supplemental emitter terminals connectable to the controller and the primary receiver; and a supplemental receiver including supplemental receiver terminals connectable to the controller and the primary receiver.

7. The supplemental photo-electric eye safety system according to claim 6, wherein said supplemental emitter comprises:

a first set of supplemental emitter terminals connectable to the controller; and a second set of supplemental emitter terminals connectable to the primary receiver, wherein said first and second sets of supplemental emitter terminals are connected to one another.

8. The supplemental photo-electric eye safety system according to claim 6, wherein said supplemental receiver comprises:

a first set of supplemental receiver terminals connectable to the controller; and a second set of supplemental receiver terminals connectable to the primary emitter; and wherein said first and second sets of supplemental receiver terminals are connected to one another.

9. The supplemental photo-electric eye safety system according to claim 6, wherein said supplemental receiver comprises:

a first set of supplemental receiver terminals connectable to the controller; and a second set of supplemental receiver terminals connectable to the primary emitter, wherein said first and second sets of supplemental receiver terminals are connected to one another; and wherein said supplemental emitter comprises:

a first set of supplemental emitter terminals connectable to the controller; and a second set of supplemental emitter terminals connectable to the primary receiver, wherein said first and second sets of supplemental emitter terminals are connected to one another, said supplemental emitter emitting a supplemental beam upon receiving a trigger signal from the primary receiver, said supplemental emitter emitting a supplemental beam upon receiving a trigger signal from the primary receiver.

10. A method for detecting obstructions of different heights in the path of a motorized movable barrier, comprising:

emitting a first beam across the movable barrier's path;

receiving said first beam;

triggering emission of a second beam across the movable barrier's path at a height different than said first beam;

receiving said second beam; and initiating at least stoppage of the movable barrier if one of said beams is interrupted.

11. The method according to claim 10, further comprising:

directing said first beam in a direction opposite said second beam.

12. The method according to claim 10, further comprising:

triggering emission of said first beam by passing a trigger signal through a receiver that receives said second beam.

13. The method according to claim 10, enabling receipt of said first beam by passing an enabling signal through an emitter that generates said second beam.

14. The method according to claim 10, further comprising:

pulling an applied voltage to a low state upon receipt of said first beam by a primary receiver;

implementing triggering by a secondary emitter upon each detection of said low state; and pulling said applied voltage to said low state upon receipt of said second beam by a secondary receiver.

15. The method according to claim 14, further comprising:

implementing initiating if said low state is not detected when expected.

16. A method for installing a supplemental photo-electric safety system to work in conjunction with a pre-existing photo-electric safety system connected to a motorized barrier operator, comprising:

cutting a first wire connected between a pre-existing emitter and a controller;

electrically connecting a receiving device between ends of said cut first wire;

cutting a second wire connected between a pre-existing receiver and said controller; and electrically connecting an emitting device between ends of said cut second wire.

17. The method according to claim 16, further comprising:

positioning said receiving device and said emitting device a substantially equivalent pre-determined distance apart from the pre-existing emitter and receiver.

* * * * *

UNITED STATES PATENT AND TRADEMARK OFFICE

CERTIFICATE OF CORRECTION

PATENT NO. : 7,228,883 B1
APPLICATION NO. : 10/860439
DATED : June 3, 2004
INVENTOR(S) : James S. Murray It is certified that error appears in the above-identified patent and that said Letters Patent is hereby corrected as shown below:

In column 9, line 46 (claim 1, line 7) the word "system" should be between the word "safety" and the word "comprises."

Signed and Sealed this

Sixth Day of November, 2007

JON W. DUDAS
*Director of the United States Patent and Trademark Office*

UNITED STATES PATENT AND TRADEMARK OFFICE

CERTIFICATE OF CORRECTION

PATENT NO. : 7,228,883 B1
APPLICATION NO. : 10/860439
DATED : June 12, 2007
INVENTOR(S) : James S. Murray It is certified that error appears in the above-identified patent and that said Letters Patent is hereby corrected as shown below:

In column 9, line 46 (claim 1, line 7) the word “system” should be between the word “safety” and the word “comprises.”

This certificate supersedes Certificate of Correction issued November 6, 2007.

Signed and Sealed this

Twenty-seventh Day of November, 2007

JON W. DUDAS
*Director of the United States Patent and Trademark Office*